R. W. E. MOORE.
MEASURING SYSTEM.
APPLICATION FILED JULY 22, 1915.
1,264,423.
Patented Apr. 30, 1918.
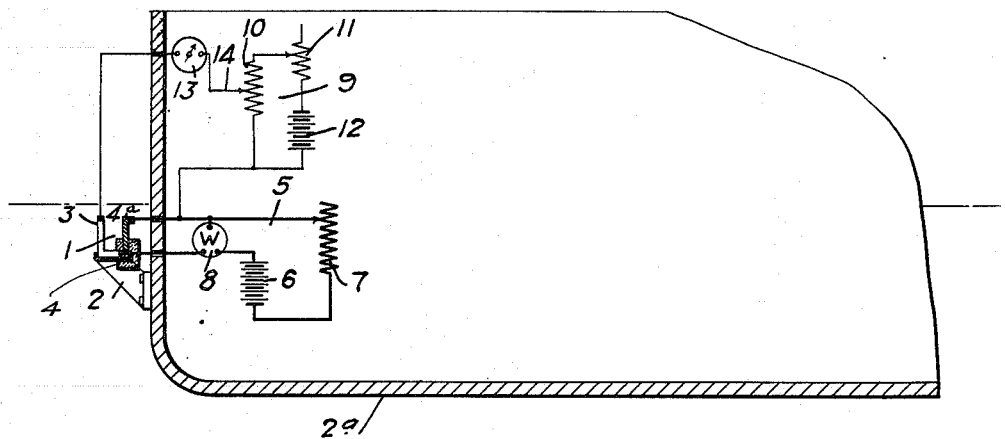
WITNESSES:
INVENTOR
Ralph W. E. Moore.
BY
ATTORNEY

UNITED STATES PATENT OFFICE.

RALPH W. E. MOORE, OF WILKINSBURG, PENNSYLVANIA, ASSIGNOR TO WESTINGHOUSE ELECTRIC AND MANUFACTURING COMPANY, A CORPORATION OF PENNSYLVANIA.

MEASURING SYSTEM.

1,264,423.  Specification of Letters Patent.  Patented Apr. 30, 1918.

Application filed July 22, 1915. Serial No. 41,267.

*To all whom it may concern:*

Be it known that I, RALPH W. E. MOORE, a citizen of the United States, and a resident of Wilkinsburg, in the county of Allegheny and State of Pennsylvania, have invented a new and useful Improvement in Measuring Systems, of which the following is a specification.

My invention relates to measuring systems and particularly to means for measuring the speed of boats.

The object of my invention is to provide an extremely simple and accurate speedometer for boats.

If a thermo-couple, having one junction so insulated that it is maintained at a predetermined temperature, is moved through water the temperature of the uninsulated junctions will vary. The temperature of the uninsulated junctions will depend upon the speed of the thermo-couple because of the cooling effect of the water in engagement therewith. Thus, if the difference in temperature between the junction that is maintained at a constant temperature and one of the other junctions is measured, an accurate indication of the speed of the thermo-couple may be obtained.

The single figure of the accompanying drawing is a diagrammatic view of a measuring system embodying my invention.

A thermo-couple 1 is mounted on a bracket 2 that projects from the hull 2ª of a boat into the water. The thermo-couple 1 may be of any ordinary type and comprises three junctions 3, 4 and 4ª. A local circuit 5, comprising a source of electromotive force 6, an adjustable resistor 7 and a wattmeter 8, is so connected across the junction 4 of the thermo-couple 1 that the junction may be heated a predetermined degree by the energy from the source of electromotive force 6. A potentiometer 9 comprises a potentiometer conductor 10, an adjustable resistor 11, a source of electromotive force 12 and a galvanometer 13. The terminals of the potentiometer 9 are connected to the terminals or junctions 3 and 4ª of the thermo-couple 1 for the purpose of determining the difference in the thermo-electromotive force between the hot and cold junctions thereof.

The junction 4 is so insulated or lagged that it is not subject to instantaneous changes in temperature due to the movement of the boat through the water. The resistor 7 is so adjusted that a predetermined amount of power traverses the same when the boat is stationary. As the boat moves through the water, the junctions 3 and 4ª are cooled, and the difference in temperature between the junctions 3 and 4 or 4 and 4ª varies substantially in direct proportion to the speed of the boat. Hence, if the potentiometer 9 is adjusted until the galvanometer 13 indicates that no current traverses the same, the pointer 14 will indicate, on a scale, (not shown) the speed of the boat. It will, of course, be understood that the speed of the boat is proportional to the difference in thermo-electromotive force, and, consequently, the difference in temperature between the hot and cold junctions. Should the temperature of the water change, the relative temperatures of the hot and cold junctions will remain the same, thus adapting the device to be used in different climates without affecting its accuracy.

While I have described my invention in its simplest form, it is understood that many modifications may be made within the spirit and scope of the invention set forth in the appended claims.

I claim as my invention:

1. A speed-measuring device for boats comprising a thermo-couple that is immersed in the water, means for heating and maintaining one junction thereof at a substantially constant temperature and means for determining the difference in temperature between the hot and cold junctions thereof, said difference in temperature being an indication of the speed of the boat.

2. A speedometer for boats comprising a thermo-couple that is immersed in the water, means for maintaining one junction thereof at a substantially constant temperature and means for determining the difference in temperature between the hot and cold junctions thereof, said difference in temperature being an indication of the speed of the boat.

3. A speedometer for boats comprising a thermo-couple that is immersed in the water, means for passing a substantially constant amount of power through one junction thereof and means for determining the difference in temperature between the hot and cold junctions thereof, said difference in temperature being an indication of the speed of the boat.

4. A speedometer for boats comprising a thermo-couple that is immersed in the water, means for passing a substantially constant amount of power through one junction thereof, and a potentiometer for determining the thermo-electromotive force difference between the hot and cold junctions thereof, said difference in thermo-electromotive force being a measure of the speed of the boat.

5. A speedometer for boats comprising a thermo-couple that is immersed in the water and having one junction thereof maintained at a relatively different temperature from that of the other junction when the boat remains stationary and means for determining the difference in temperature between the hot and cold junctions when the boat moves through the water.

6. A speedometer for boats comprising a thermo-couple that is immersed in the water and means for determining the change in temperature between the hot and cold junctions thereof as one of them is cooled by movement of the boat through the water, one of the junctions being heated to a predetermined temperature.

7. A speedometer for boats comprising a thermo-couple that is immersed in the water, means for maintaining one junction of the thermo-couple at a predetermined temperature and means for determining the difference in temperature between the hot and cold junctions thereof.

In testimony whereof, I have hereunto subscribed my name this 15th day of July, 1915.

RALPH W. E. MOORE.